Aug. 3, 1943.                W. R. HEARN                2,326,030
PUPILLARY SCALE
Filed Oct. 18, 1940
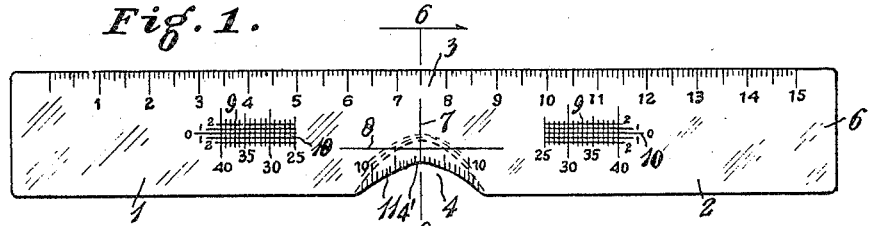
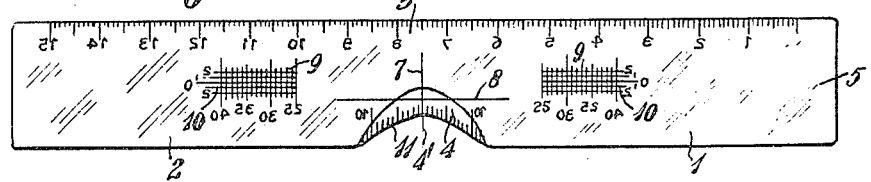
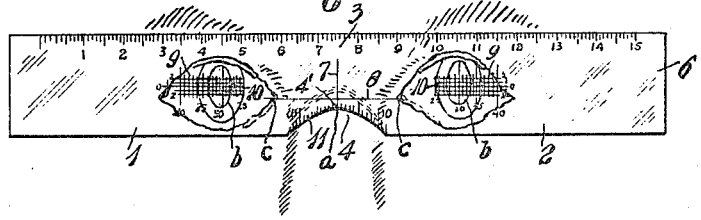
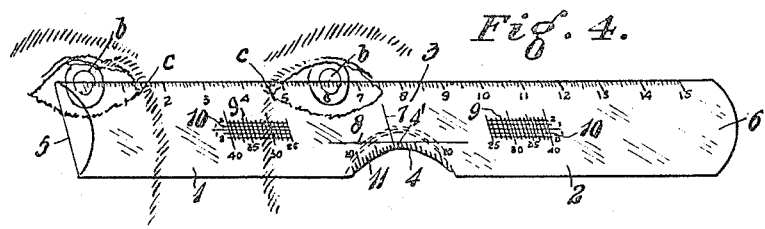
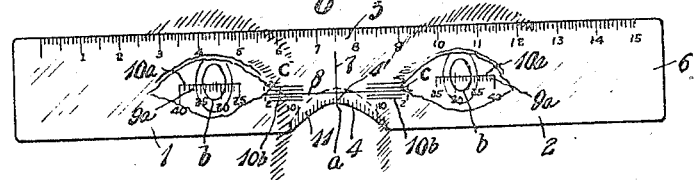
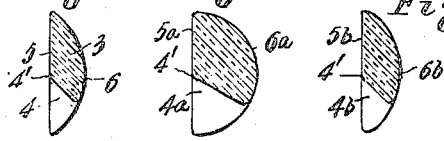
INVENTOR.
William R. Hearn
Clarence Pardew
BY Patented Aug. 3, 1943

2,326,030

UNITED STATES PATENT OFFICE 2,326,030

PUPILLARY SCALE

William R. Hearn, Cincinnati, Ohio

Application October 18, 1940, Serial No. 361,747

3 Claims. (Cl. 88—20)

My invention relates to optical equipment, and more especially to instruments for use of optometrists in ascertaining some relation of the pupils of the eyes to each other or to some other feature of the patient.

One object is to render reference of indicia of the instrument to the pupils or other features less difficult yet to increase the accuracy of ascertainment of the relation or relations. A further object is to magnify the pupils or other features, further to facilitate the reference and ascertainment. A further, and preferred object, is to afford a plurality of references and ascertainments of that kind, upon one setting of the scale or instrument. In general, the object is to facilitate and increase the accuracy of such measurements as are required to prescribe those factors entering into the production of eye glasses as regards the mounting of the lenses, and aside from the optical proportions of the lenses themselves, so that when the glasses are fitted to the patient with the lenses included, the lenses will be properly related to the pupils of the eyes for maximum correctness of vision, and will be supported to maintain proper relation of the lenses to the eyes with full comfort to the wearer of the glasses. A further, and preferred, object is to make the instrument of minimum weight commensurate with its purpose, and yet have the instrument amply strong and durable.

Other objects will appear in the course of the following description, illustrated by the accompanying drawing, in which:

Figure 1 is a front elevation of the scale;

Fig. 2 is a rear elevation of the same;

Fig. 3 shows the scale applied to eyes;

Fig. 4 is a front view showing the scale otherwise applied to the eyes;

Fig. 5 is a view similar to Fig. 3, but showing a modified scale;

Fig. 6 is a cross section on the vertical plane of the line 6—6 of Fig. 1;

Fig. 7 is a similar view showing a modified cross section; and

Fig. 8 is another similar view showing a second modified cross section.

As shown in Figs. 1 to 4, inclusive, the scale consists of a single piece of transparent material, preferably the plastic material known as "Lucite," which has very nearly the same properties as good optical glass and has sufficient hardness and strength to withstand wear and impacts, as by dropping. This pieces, as shown in Fig. 6 is of cross section, except midway of its length, substantially a segment of a circle; while at the midlength there is a recess opening out from one of the edges of the piece. That is to say, the scale has the portions 1 and 2 of the full segmental cross section extending in opposite directions from the middle portion 3 of the same cross section except for the recess 4. The segmental cross section is of uniform radius throughout the portions 1 and 2 and the middle portion 3, to form the front side of the scale, and the chordal or rear side 5 is substantially plane; the convexity of the front side and the plane of the rear side 5 being as nearly perfect as is possible in commercial production and as is required to constitute the piece a prism which is an elongated segment of a cylinder. With such shape, the piece so refracts from rear to front as to enlarge the apparent length of an object in the chordal direction, when the object, in back of the scale, is viewed from the front of the scale. This is noted in Fig. 3, where the irises and pupils of the eyes appear elliptical with the major axis of the ellipse across or in the chordal direction. The scale being applied to the eyes with the axis of the segment approximately midway of the upright diameters of the irises and pupils, this approximately elliptical, not oval, appearance is had. Being a substantially straight segment of a cylinder, there is substantially no magnification crosswise of the irises and pupils, i. e., lengthwise of the scale.

This kind of magnification also is had in increased degree with a substantially semicylindrical cross section as indicated in Fig. 7; this formation being practical, though not preferred as it makes the up and down length of the ellipse greater than the corresponding width of the scale, with some distortion of the appearance. In Fig. 8 the convexity is that of the longest half of an ellipse, with a somewhat improved appearance of the irises and pupils as apparent ellipses; this form having merely the disadvantage of requiring more care in the making of the apparatus for producing it. When made of plastic material, of which "Lucite," as before mentioned, is the preferred material, the scale is made by molding under heat and pressure as is usual with the various plastics of such nature. Other plastics may be used, but must have highly uniform refractive properties and clearness; and of course glass may be used, with the disadvantages of being harder and less easily marked, and being more breakable than "Lucite" or other plastics. Also it will be understood that any other transparent material having the above mentioned properties in adequate degree for practical use, may form the scale.

In Figs. 6, 7 and 8 the flat sides are numbered 5, 5a and 5b, and the convex sides are numbered 6, 6a and 6b, respectively; and the recesses are numbered 4, 4a and 4b, respectively. Any of these recesses, as the recess 4 of Figs. 1, 2, 3, 4 and 6, is formed to receive the bridge of the patient's nose for supporting the scale on the nose while the scale is held across the eyes by the operator's hand or hands. For this purpose the recess is formed so that its top and sides recede upwardly from front to rear; the degree of this upward recession and the width of the recess being such that the recess will receive the most prominent and widest nose likely to be encountered. The sides of the recess have a low degree of concave curvature and meet the top, which is of a considerably higher degree of concave curvature. The shape and size of the recess 4, 4a or 4b is such that in any case the top curvature, at 4', will meet the top of the nose bridge at a tangent, the point of which is at the median upright line of the nose.

This meeting point is the base from which the measurements are taken in the opposite directions, for distances of the respective pupils from this base point. The recess, having the relation to the nose, substantially, that is to be had by the bridge piece of the eye glasses that are to be fitted, thus enables the operator to set the scale so that the dimensions taken can be referred to the bridge piece of the glasses being made for the case. The extent of the recess sides along the nose adequately bases the scale on noses of different shapes and for rocking the scale front to rear for best view through the scale.

All of the indicia are placed on the back 5 of the transparent prism, which, being flat except within the recess 4, 4a or 4b, permit of more ready and accurate formation in the molding operation. What is more important, the indicia are thus brought close to the eyes when the scale is set back astraddle of the nose, for maximum accuracy of reference. The setting of the scale thus had is such that it magnifies the pupils in upright direction to the right degree; but the indicia being, in any of the examples, between the focal line of the cylindrically, or approximately cylindrically, conforming prism and the front thereof, the indicia are not magnified nor distorted. It will be understood, therefore, that in all views except Fig. 2, the indicia are seen through the transparent prism; and that Fig. 2 shows the rear side with the indicia directly seen, with the numerals in reverse.

The upright line 7, meeting the top curve of the recess 4 at the point of tangency with the nose bridge, is the base line of the scale for the bridge-to-pupil measurements above mentioned. This line 7 assists the operator in setting the instrument at the tangent point. But the instrument is tiltable in the plane of its length, with the tangent point as the pivot. To enable the operator accurately to posture the instrument in this respect, the posture line 8 crosses the upright base line 7 at right angles at such height that, when the instrument is in correct posture this line 8 coincides with very limited areas at the inner corners of the eyes; the technical name for such an area being canthus.

For any eye this area is approximately three millimeters below the average plane of the pupils; variation in any case being practically negligible. These areas are very readily recognized as definite reference points by the practiced optometrist. The tangent point on the nose bridge is designated a, the pupils b, and the reference points at the inner corners of the eyes, just mentioned, being designated c.

Not only do pupils b of the two eyes often have different distances from the middle line or point a of the nose, i. e., different monocular distances; often one pupil b is at a greater height than the other, with reference to the areas or canthi of the respective eyes. It of course is important to construct the eye glasses so that the foci of the lenses will be correctly located relative to the pupils when the glasses are supported on the nose, as to monocular distances from the nose bridge; but it is also important that the relation of the foci to the pupils be correct in respect of altitude. For merely monocular measurement it is not so important that the scale be so accurately postured in the plane of its length as before mentioned; but for the relative altitude measurements this correct posture in respect of some part of the structure surrounding the eye is important for insuring a practically correct measurement of the respective altitudes of the pupils. Hence the posture line 8 as before described.

In an area lying in front of the pupil when the scale is set in position, is a set of vertical lines or graduations 9 crossed by a set of horizontal graduations 10, i. e., considering the scale to be set horizontally and without consideration of slight variations from the horizontal, according to the configuration and posture of the head of the patient. There is a set of these graduations 9 and 10 for each eye. As here shown a horizontal line of each set is succeeded upwardly and downwardly by two lines in each direction; there being thus five lines or graduations 10 in the set. Also, as here shown, sixteen vertical lines cross the horizontal lines in each set of lines 9. The metric system preferably is used, being the established system for optical measurements; and it will be understood that the horizontal and vertical lines 10 and 9 indicate millimeters. Certain lines are more extended and have numbers, as 25, 30, 35 and 40 for the vertical graduations, indicating those numbers of millimeters from the base line 7 at the middle; and as 1 and 2 for the horizontal lines or graduations, indicating those numbers of millimeters above or below the middle horizontal line of the set, marked 0.

For example of use, in Fig. 3 the pupil b seen at the left is 31 millimeters from base line 7, while pupil b seen at the right is 30 millimeters frome base line 7. Also, pupil b seen at the left has the middle horizontal line through its center, so that it is noted as at zero altitude, while pupil b seen at the right has the next line up from the middle line through its center, so that it is noted as of altitude one up. Of course up may be noted as plus and down as minus altitude; it being understood that a prescription form may have the various measurements noted on it according to choice of the operator. From this prescription the optician proportions the mounting to fit in accordance with the measurements given.

Along the edge portions of the recess 4, 4a or 4b, are graduations basing from the upright base line 7, for measuring the width of the nose bridge. These graduations, designated 11, and here understood to be metrical as are the others before described, preferably are numbered in the opposite directions from base line 7, permitting each side portion of the nose bridge to have noted the distance of its side from its middle, at base line 7. The numbers here shown are 10, designating as many millimeters at each side; the extent of the series being here twelve millimeters, their sum, twenty-four millimeters, being about the maximum nose bridge width encountered. The dimensions thus taken are noted so that the optician will make the bridge piece of the eye glasses to correctly locate the lenses, or their frames, with relation to the nose bridge. It will be understood that the eye glasses, mentioned as such anywhere herein, may be those with bows for the ears, either with or without articulated means to contact the nose; or may be those that merely grip the nose, or pince nez, more commonly called eye glasses, whereas those with bows are called spectacles. My invention is suited for measurements to guide the making of any eye glasses of any style or type, including those just mentioned.

Along the edge of the scale opposite to that having recess 4, 4a or 4b, are graduations, metric in well known style, continuously numbered from near one end of the scale to near the other end; in this case being fifteen centimeters. These may be used for binocular measurement, i. e., from one pupil to the other, as represented in Fig. 4; thus checking the two monocular measurements of Fig. 3—the total binocular against the sum of the monocular measurements. This scale also is useful for any other measurements, with reference to the eyes, or to any thing else; being a general utility scale for the optometrist in the manner of ordinary scales now used by such practitioners.

The scale is relatively small and light, to readily be carried in the operator's pocket. Being preferably a single piece, without parts to manipulate, adjust and fasten, the maximum simplicity of carriage and use is had, and with the wear reduced merely to that on the surface of the instrument, eliminating the question of wear between operating parts. In such material as "Lucite," before mentioned, a high degree of resistance to wear and scratching is had, more nearly comparable with such properties of glass; endurance under shocks, against breakage, is higher than that of glass; and the instrument is much lighter than would be one of glass, metal or the like, while the transparency and optical qualities compare very favorably with those of the best optical glass. The shaping for magnification allows relief of strain on the operator, by the elliptical enlargement of the pupils. Also it insures more accurate measurements, as the upright major axis of the elliptical enlargement may be estimated much more closely than can the mere diameter of the pupil, with no magnification. The measurements can be taken to the edge of a pupil, if that is understood in the prescription; in which case the more nearly straight lateral edges of the elliptical magnifications can have the scale graduations related to them much more easily and accurately, compared with tangents of unmagnified circular pupils.

Reference of the relative altitude lines 10 to the centers of the pupils is not impaired by the vertical enlargement, but is rather aided by the vertically elongated pupil image being vertically of greater extent than is the series of horizontal lines or graduations 10, so that the upper and lower ends of the elliptical pupil image appear above and below the series of graduations 10 in a way to facilitate estimation of the center of the pupil. Also it will be understood that the graduations 9 may be arranged for reference to the lower edge of the pupil, or to its upper edge.

In Fig. 5, the scale is the same as that of the preceding example, except that the provision for noting relative altitude of the pupils is modified. Thus, it has the upright base line 7; and at the proper height has, to come before each pupil, lengthwise lines 10a and vertical graduations 9a along each line 10a, numbered as in the previous example. These graduations before the pupils thus are the same except that lines above and below a base line, to which line 10a here corresponds, are omitted. Lines 10b corresponding to such lines are arranged above and below the posture line 8, and are numbered up and down, for reference to the eye corners or canthi when lines 10a both are coinciding with their respective pupils. The difference therefore is that the scale is tilted to aline with the pupils and the reading is made with reference to canthus locations that were used in the previous example to posture the scale to aline with those locations and the reading is made with reference to the pupils.

An advantage of having a transparent scale is the non-interference with the patient's seeing, so that the patient's pupils remain normally dilated, instead of contracting very considerably in the dark behind an instrument of opaque material. Of course this would be an advantage were the scale merely plano and not magnifying, if the scale were transparent with the other features of my scale benefiting from the transparency.

Several modifications have been instanced, but it will be understood that I am not limited to the rather precise disclosure herein, as to structure, materials or mode of use, but that what I claim as new and desire to secure by Letters Patent is:

1. A pupillary scale having a middle portion with an edge part shaped to straddle the nose for positioning said scale for use, and having lateral extensions to lie across the pupils when said scale is so positioned, said scale being transparent throughout said middle portion and its nose-straddling edge part and said extensions, each extension being, throughout its extent across the pupils when the scale is so positioned, of substantially uniform upright cross section which has its outer side, remote from the pupils, convexly curved relative to its inner side, said middle portion having index means referable to a feature of the patient by view through said middle portion, and said extensions having, on their inner sides, index means referable to the pupils by view through said extensions, for definition of locations of said pupils relative to said feature, said definitions being facilitated by upright magnification of the pupils without substantial transverse magnification thereof, due to said cross section of said extensions.

2. A pupillary scale of transparent material of a length to lie across the nose and across the pupils, and having a recess portion that straddles the nose, said scale being of cross section, throughout the length across the nose and pupils, substantially uniformly plano-convex with the recess portion so presented to straddle the nose that the convex side is thereby presented outward, remote from the pupils, for upright magnification of the pupils without substantial transverse magnification thereof, said recess portion deriving from said cross section a substantial bearing along the nose, and said scale having on its inner side index means referable to a facial feature of the patient and, also on said inner side, index means referable to the pupils for defining locations of the pupils relative to said feature.

3. A pupillary scale having a middle portion with an edge part shaped to straddle the nose for positioning said scale for use, and having lateral extensions each continuous in structure to lie across the pupils when said scale is so positioned, said scale being transparent throughout said middle portion and its nose-straddling edge part and the continuous structures of said extensions, said middle portion having a posture line portion to be registered with each canthi for definitely posturing the scale, the line portions being referable to said canthi by view through said transparent middle portion, and said extensions having respective upright series of indices, referable to the pupils by view through the transparent structures of said extensions, for definition of the altitude of each pupil relative to said posture line portions.

WILLIAM R. HEARN.